United States Patent
Tiirola et al.

(10) Patent No.: US 10,498,499 B2
(45) Date of Patent: Dec. 3, 2019

(54) METHOD AND APPARATUS FOR CHANNEL RESERVATION WINDOW IN UNLICENSED BAND

(71) Applicant: Nokia Solutions and Networks Oy, Espoo (FI)

(72) Inventors: Esa Tapani Tiirola, Kempele (FI); Timo Erkki Lunttila, Espoo (FI); Kari Juhani Hooli, Oulu (FI); Klaus Hugl, Vienna (FI)

(73) Assignee: Nokia Solutions and Networks Oy, Espoo (FI)

( * ) Notice: Subject to any disclaimer, the term of this patent is extended or adjusted under 35 U.S.C. 154(b) by 7 days.

(21) Appl. No.: 15/309,385

(22) PCT Filed: Jun. 13, 2014

(86) PCT No.: PCT/EP2014/062345
§ 371 (c)(1),
(2) Date: Nov. 7, 2016

(87) PCT Pub. No.: WO2015/169397
PCT Pub. Date: Nov. 12, 2015

(65) Prior Publication Data
US 2017/0085346 A1 Mar. 23, 2017

(30) Foreign Application Priority Data
May 8, 2014 (WO) .................. PCT/EP2014/059408

(51) Int. Cl.
*H04W 56/00* (2009.01)
*H04L 5/00* (2006.01)
(Continued)

(52) U.S. Cl.
CPC .......... *H04L 5/0001* (2013.01); *H04L 5/0037* (2013.01); *H04L 5/0055* (2013.01);
(Continued)

(58) Field of Classification Search
CPC . H04W 28/26; H04W 56/0045; H04W 74/00; H04L 27/2666; H04L 1/1678; H04N 21/266
See application file for complete search history.

(56) References Cited

U.S. PATENT DOCUMENTS

2014/0161002 A1* 6/2014 Gauvreau ............. H04W 16/24
370/280
2014/0341018 A1 11/2014 Bhushan et al.
(Continued)

FOREIGN PATENT DOCUMENTS

EP 2059060 A2 5/2009
EP 2282468 A1 2/2011
(Continued)

OTHER PUBLICATIONS

International Search Report and Written Opinion received for corresponding Patent Cooperation Treaty Application No. PCT/EP2014/062345, dated May 8, 2014, 13 pages.
Rapeepat et al., "License-exempt LTE deployment in heterogeneous network", Wireless Communication Systems (ISWCS), 2012 International Symposium ON, IEEE, Aug. 28, 2012, pp. 246-250, XP032263759, DOI: 10.1109/ISWCS. 2012 6328367.
(Continued)

*Primary Examiner* — Salvador E Rivas
(74) *Attorney, Agent, or Firm* — Brake Hughes Bellermann LLP

(57) ABSTRACT

There is provided a method, comprising: setting, by a radio device, length for a channel reservation window such that the channel reservation window comprises a plurality of subframes; dividing the channel reservation window at least into a downlink part and an uplink part, wherein the downlink part comprises at least one or more subframes of the plurality of subframes and the uplink part comprises at least one or more other subframes of the plurality of subframes; determine a timing offset between the start of the downlink part and the start of the uplink part, wherein the timing offset is based at least partly on applied timing advance; and defining timings, within the channel reservation window, for
(Continued)

Figure 1:
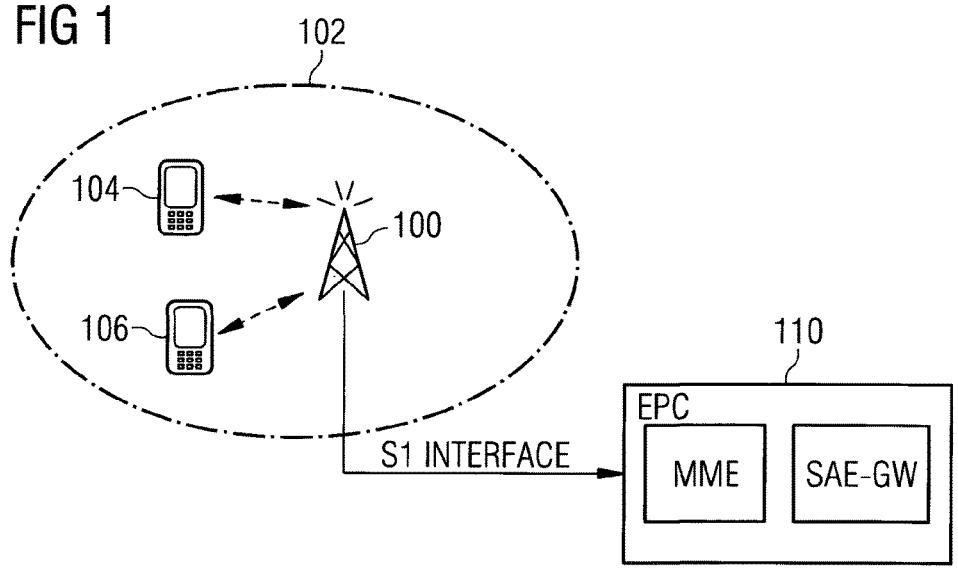

at least one of a downlink clear channel assessment-process and an uplink clear channel assessment-process at least partly on the basis of the timing offset.

18 Claims, 8 Drawing Sheets

(51) Int. Cl.
    *H04W 74/00*     (2009.01)
    *H04W 28/26*     (2009.01)
    *H04W 72/04*     (2009.01)
    *H04W 74/08*     (2009.01)
    *H04L 27/26*     (2006.01)
    *H04N 21/266*     (2011.01)
    *H04L 1/16*     (2006.01)

(52) U.S. Cl.
    CPC ........... *H04L 5/0092* (2013.01); *H04W 28/26* (2013.01); *H04W 56/0045* (2013.01); *H04W 72/0453* (2013.01); *H04W 74/00* (2013.01); *H04W 74/0808* (2013.01); *H04L 1/1678* (2013.01); *H04L 27/2666* (2013.01); *H04N 21/266* (2013.01)

(56) References Cited

U.S. PATENT DOCUMENTS

| | | |
|---|---|---|
| 2015/0223241 A1 | 8/2015 | Cattoni et al. |
| 2015/0230268 A1* | 8/2015 | Chen .................. H04L 5/14 370/280 |

FOREIGN PATENT DOCUMENTS

| | | |
|---|---|---|
| EP | 2862384 A1 | 4/2015 |
| JP | 2011-519232 A | 6/2011 |
| JP | 2016-520270 A | 7/2016 |
| RU | 2485708 C9 | 11/2013 |
| WO | 2012109195 A2 | 8/2012 |
| WO | 2013112983 A2 | 8/2013 |
| WO | 2013/185835 A1 | 12/2013 |
| WO | 2013185835 A1 | 12/2013 |
| WO | 2014/189912 A1 | 11/2014 |

OTHER PUBLICATIONS

IEEE Standard for Air Interface for Broadband Wireless Access Systems. IEEE Std 802.16/2012 dated Aug. 17, 2012.
International Search Report and Written Opinion received for corresponding Patent Cooperation Treaty Application No. PCT/EP2014/059408, dated ecember 19, 2014, 3 pages.
"Review of Regulatory Requirements for Unlicensed Spectrum", 3GPP TSG-RAN meeting #63, RP-140054, Agenda: 14.2, Alcatel-Lucent, Mar. 3-6, 2014, pp. 1-16.
"Broadband Radio Access Networks (BRAN); 5 GHz high performance RLAN; Harmonized EN covering the essential requirements of article 3.2 of the R&TTE Directive" ETSI EN 301 893, V1.7.1, Jun. 2012, pp. 1-90.
"3rd Generation Partnership Project; Technical Specification Group Radio Access Network; Evolved Universal Terrestrial Radio Access (E-UTRA); Base Station (BS) radio transmission and reception (Release 14)", 3GPP TS 36.104, V14.1.0, Sep. 2016, pp. 1-211.
"3rd Generation Partnership Project; Technical Specification Group Radio Access Network; Evolved Universal Terrestrial Radio Access (E-UTRA); Base Station (BS) conformance testing(Release 14)", 3GPP TS 36.141, V14.1.0, Sep. 2016, pp. 1-316.
Office action received for corresponding Vietnam Patent Application No. 1-2016-04677, dated Dec. 26, 2016, 1 page of office action and 1 page of translation available.
Office action received for corresponding Canadian Patent Application No. 2947918, dated Feb. 2, 2017, 4 pages.
Office action received for corresponding sponding Russian Patent Application No. 2016145613, dated Oct. 13, 2017, 9 pages of office action and 3 pages of office action translation available.
Office action received for corresponding sponding Japanese Patent Application No. 2017-510729, dated Jan. 23, 2018, 3 pages of office action and 5 pages of office action translation available.
Korean Office Action for Application No. 10-2016-7034465, dated Sep. 10, 2018; 5 pages.
3GPP TS 36.213 V12.0.0; 3rd Generation Partnership Project; Technical Specification Group Radio Access Network; Evolved Universal Terrestrial Radio Access (E-UTRA); Physical Layer Procedures (Release 12); Dec. 2013; Sophia Antipolis, France; 186 pages.
Office Action for India Application No. 201647041283, dated Jul. 23, 2019, 6 pages.

\* cited by examiner

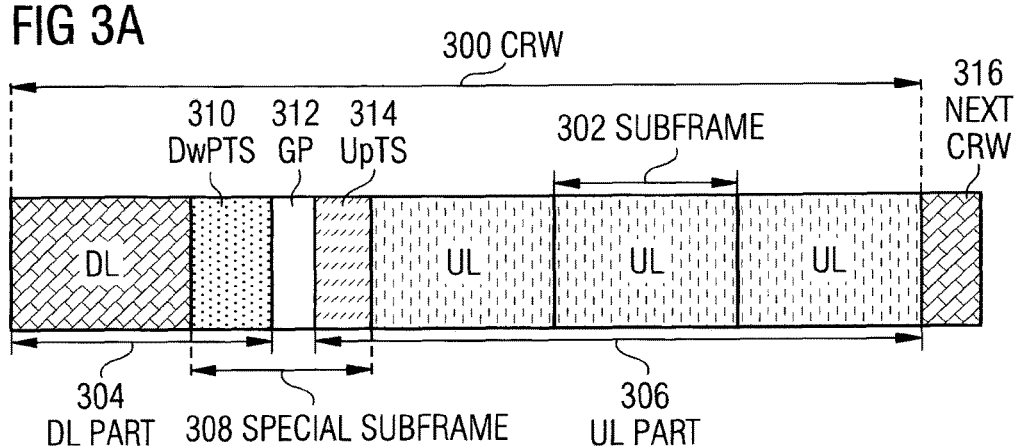
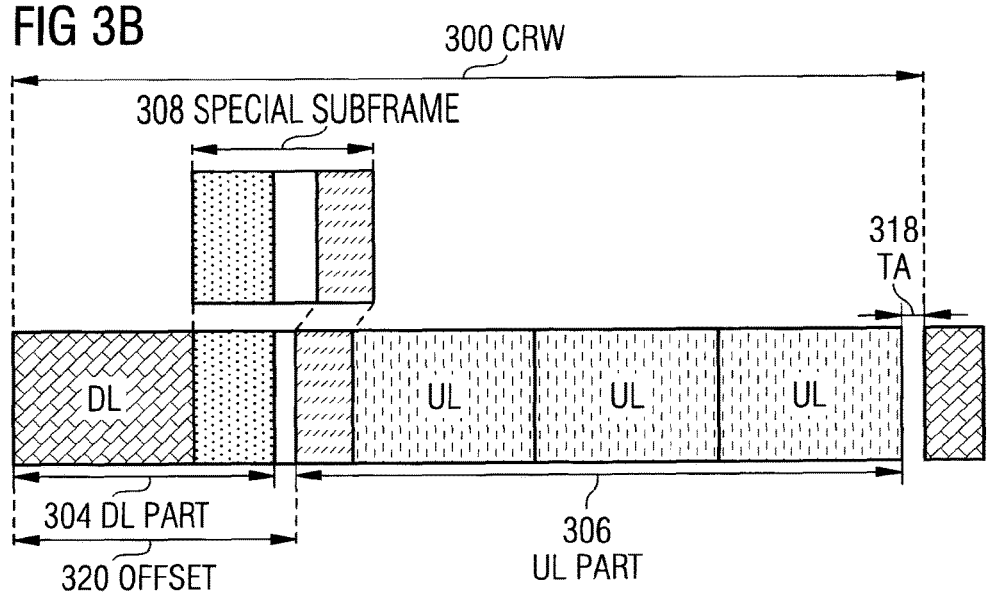
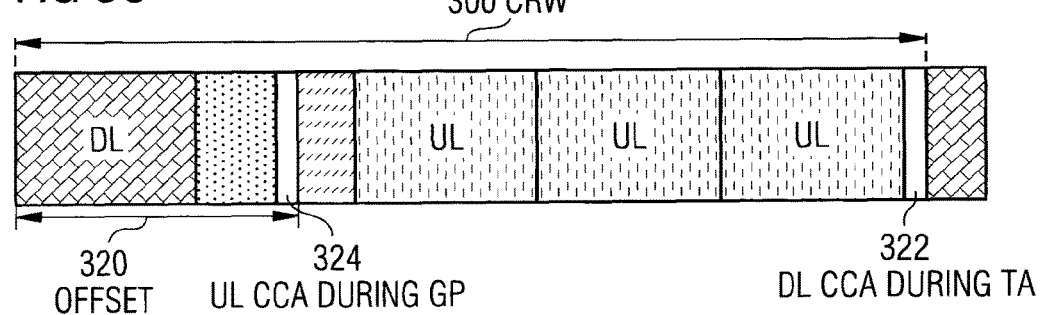

US 10,498,499 B2

METHOD AND APPARATUS FOR CHANNEL RESERVATION WINDOW IN UNLICENSED BAND

RELATED APPLICATION

This application was originally filed as Patent Cooperation Treaty Application No. PCT/EP2014/062345 filed Jun. 13, 2014 which claims priority benefit to PCT application PCT/EP2014/059408 filed May 8, 2014.

FIELD OF THE INVENTION

The invention relates generally to improving communication efficiency. More specifically, the invention relates to enabling efficient communication on an unlicensed frequency band.

BACKGROUND

Wireless data usage is growing exponentially and operators are facing capacity constraint in the networks. As licensed band communication resources are limited (and can be very costly to obtain) and there is an ever increasing demand for the resources, one possible approach is to apply unlicensed frequency bands for the communication.

BRIEF DESCRIPTION OF THE INVENTION

The invention is defined by the independent claims.

According to an aspect of the invention, there is provided an apparatus comprising processing means configured to cause the apparatus to perform any of the embodiments as described in the appended claims.

Some embodiments of the invention are defined in the dependent claims.

LIST OF THE DRAWINGS

Figure 2:
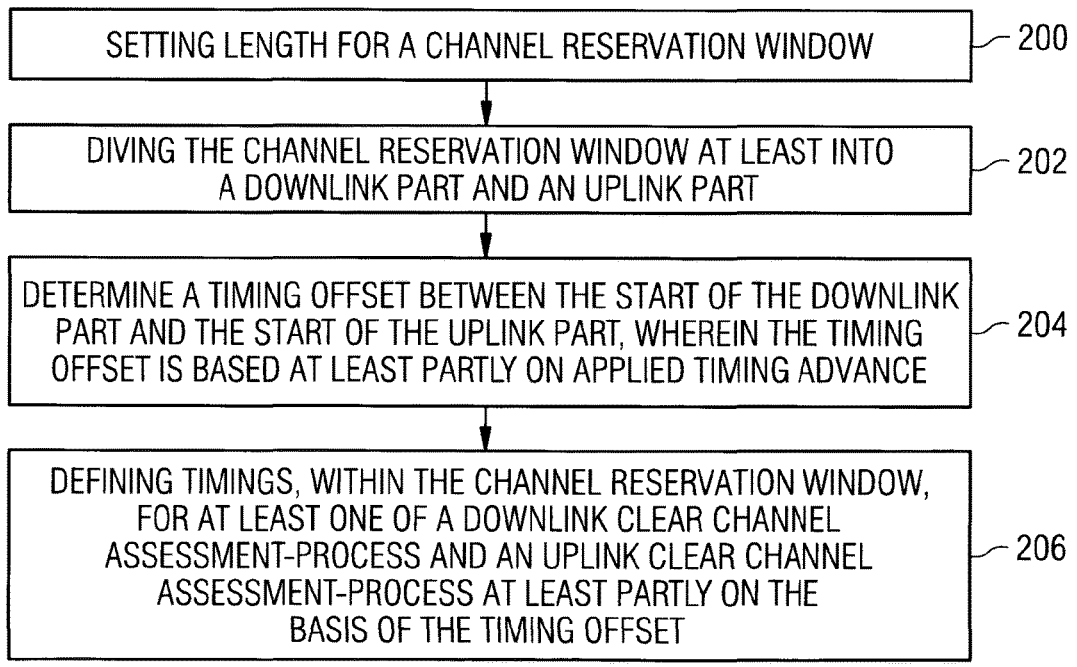
Figure 4A:
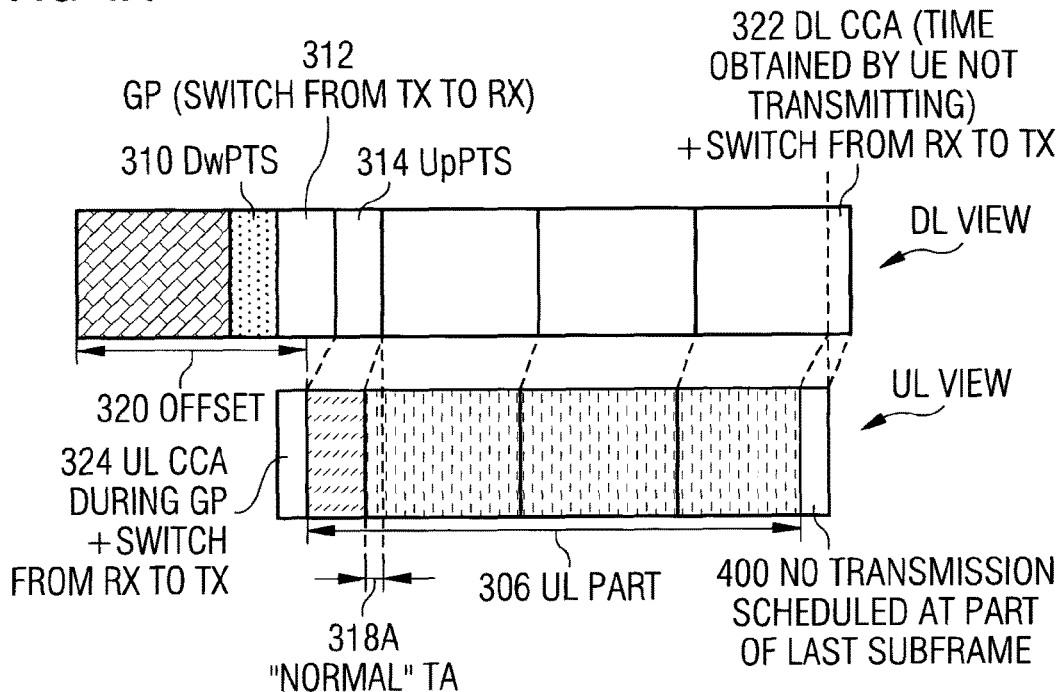
Figure 4B:
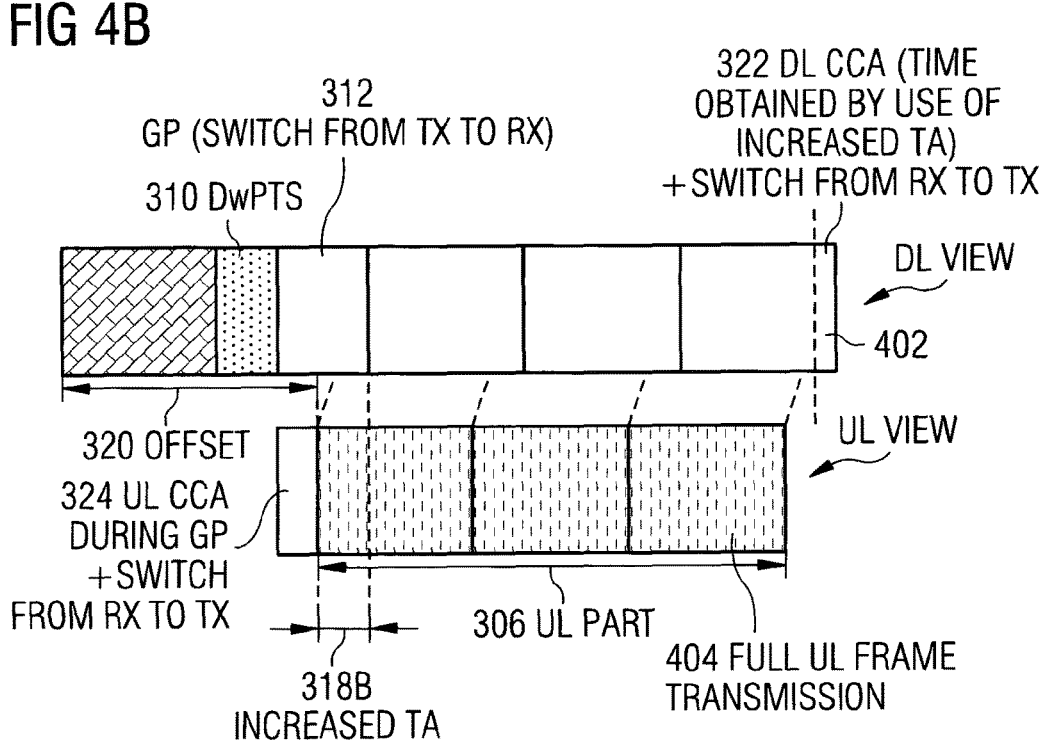
Figure 4C:
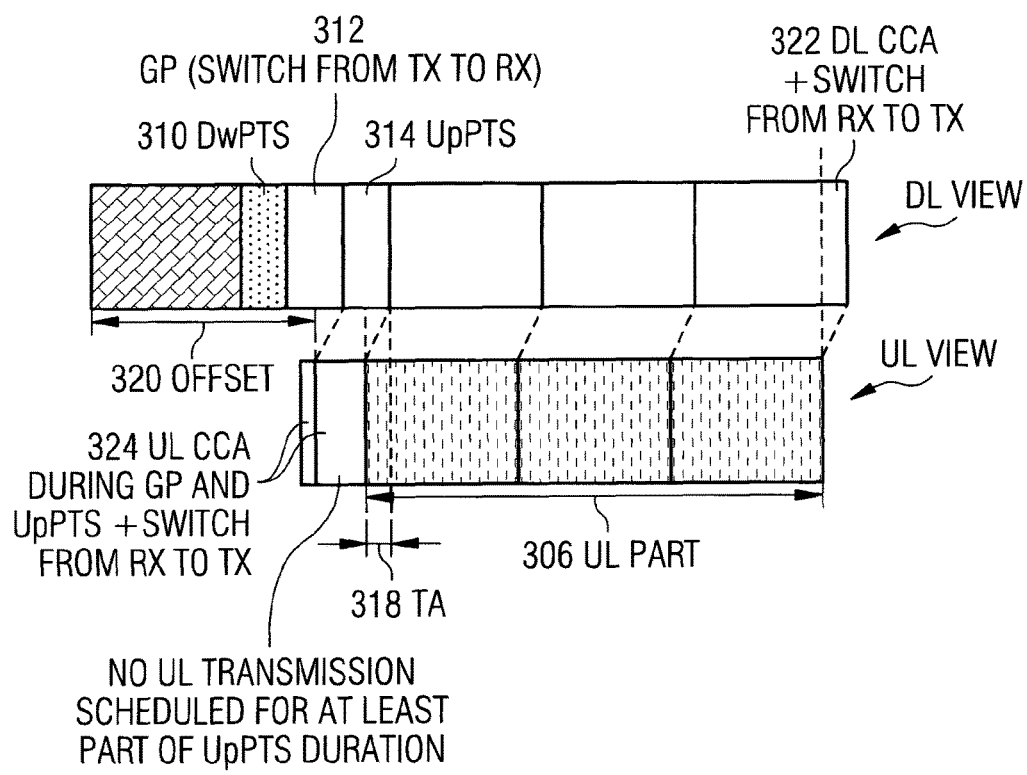
Figure 5:
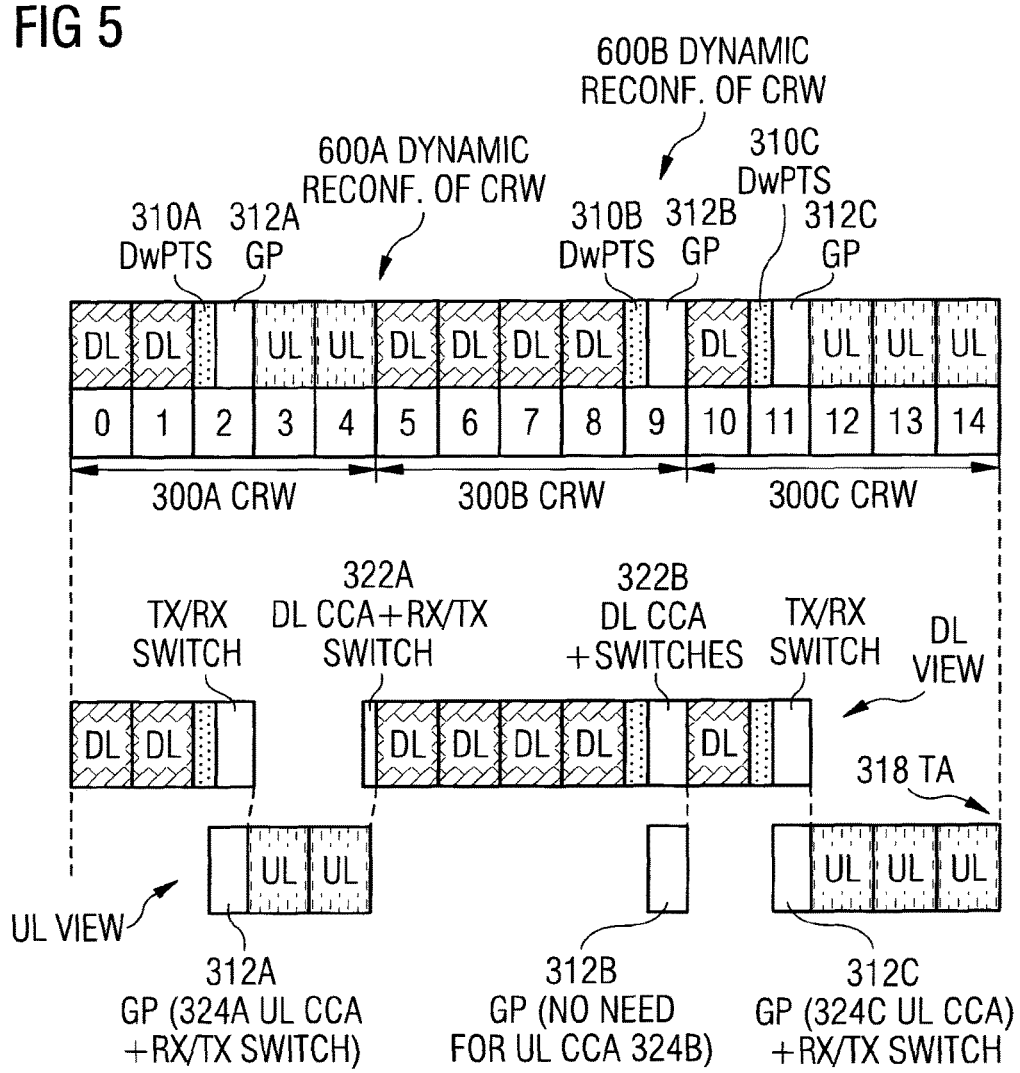
Figure 6:
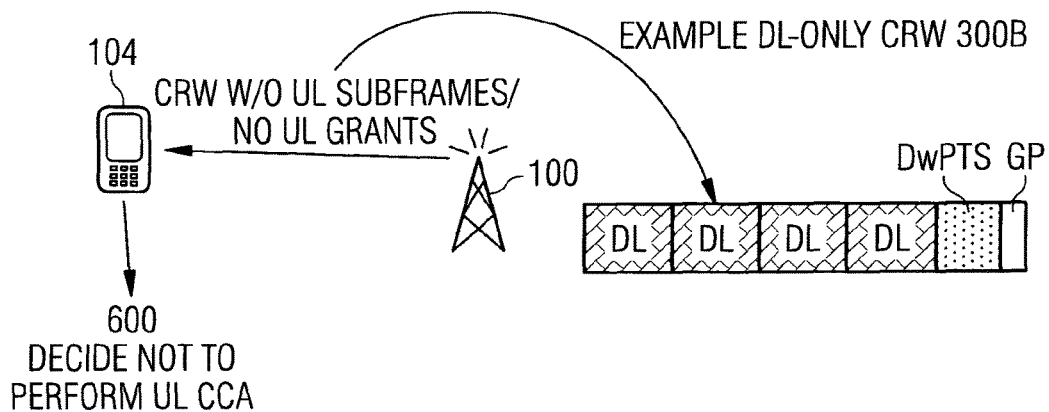
Figure 7A:
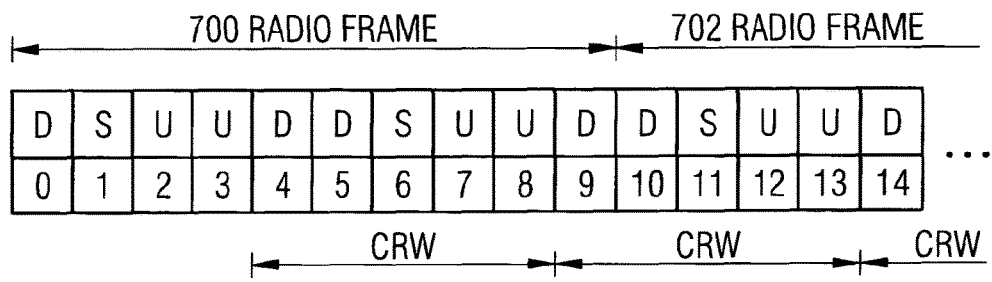
Figure 7B:
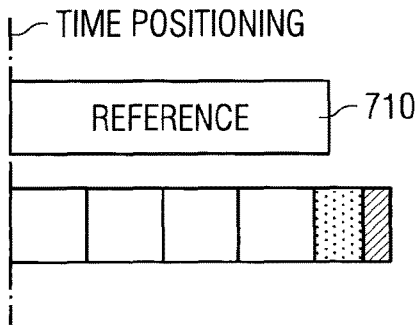
Figure 7C:
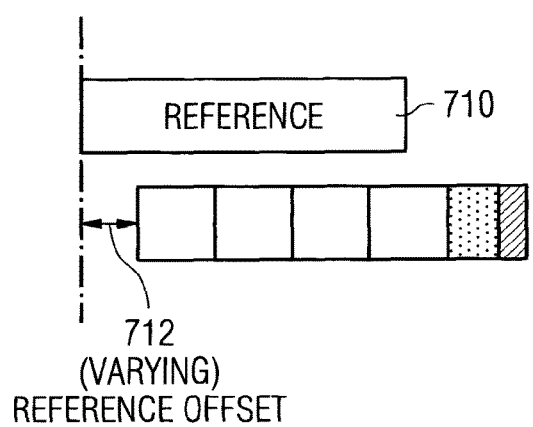
Figure 8:
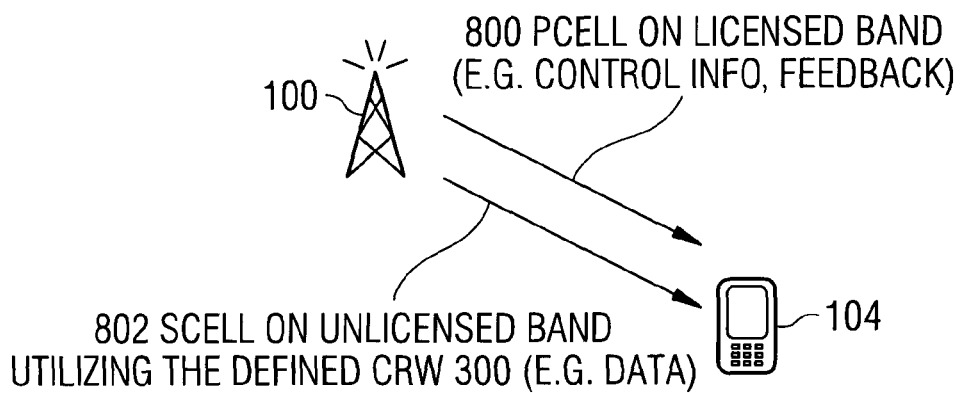
Figure 9:
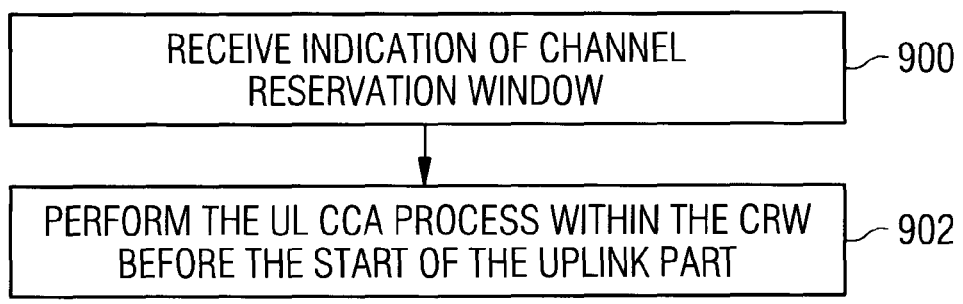
Figure 10A:
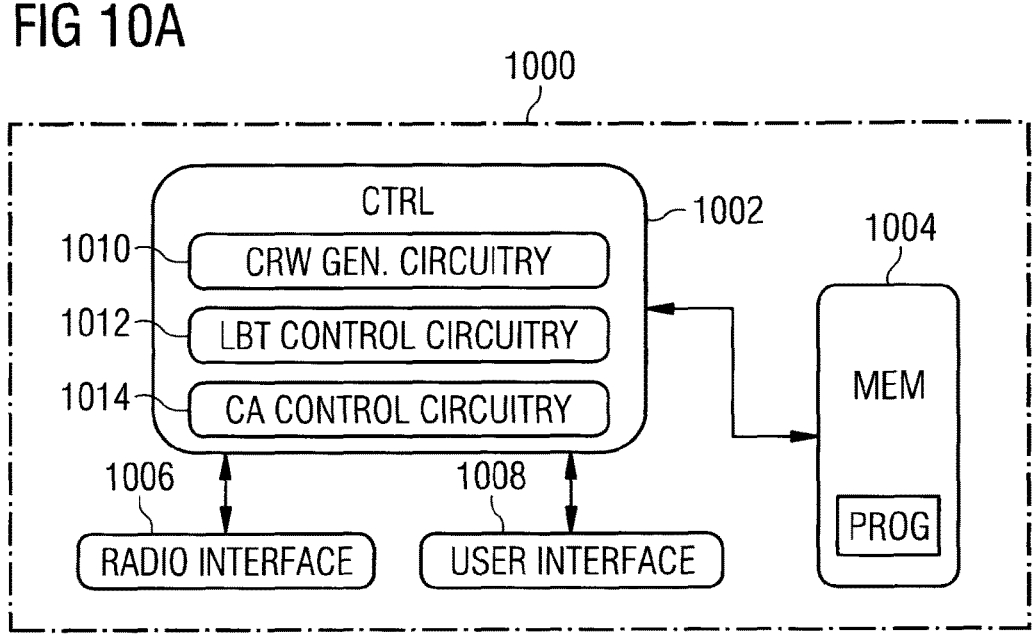
Figure 10B:
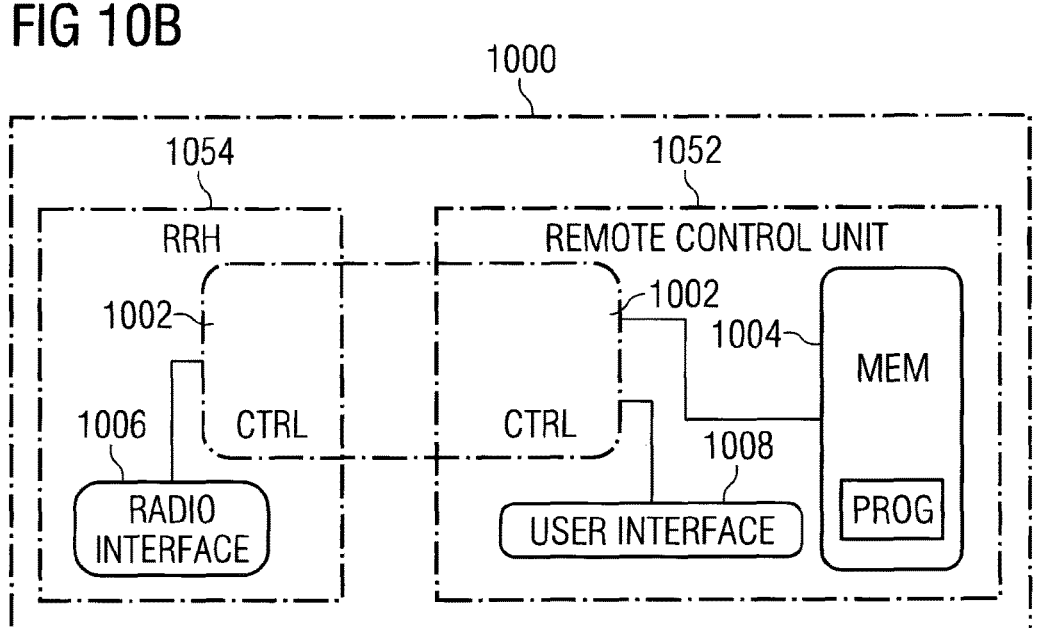

In the following, the invention will be described in greater detail with reference to the embodiments and the accompanying drawings, in which FIG. 1 presents a network, according to an embodiment;
FIG. 2 shows a method, according to an embodiment;
FIGS. 3A to 3C show an example channel reservation window;
FIGS. 4A to 4C illustrate timing for clear channel assessment processes, according to some embodiments;
FIG. 5 depicts an example for reconfiguring the channel reservation window, according to an embodiment;
FIG. 6 illustrates a scenario in which a terminal device may not perform an uplink clear channel assessment process, according to an embodiment;
FIG. 7A to 7C shows timing issues between a reference and the channel reservation window, according to some embodiments;
FIG. 8 illustrates an example of carrier aggregation, according to an embodiment;
FIG. 9 illustrates a method, according to an embodiment; and
FIGS. 10A and 10B illustrate an apparatus, according to some embodiments.

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a radio system, such as in at least one of the following: Worldwide Interoperability for Micro-wave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced (LTE-A), and/or 5G system.

FIG. 1 shows a network to which the embodiments may be applicable. Radio communication networks, such as the Long Term Evolution (LTE) or the LTE-Advanced (LTE-A) of the 3rd Generation Partnership Project (3GPP), are typically composed of at least one base station 100 providing coverage to a cell 102. Each cell 102 may be, e.g., a macro cell, a micro cell, or a pico-cell, for example. The base station 100 may be, e.g., an evolved node B (eNB) as in the LTE and LTE-A, or any other apparatus capable of controlling radio communication and managing radio resources within a cell. For example, in UMTS, a base station (node B) may be at least partly controlled by a radio network controller (RNC). In GSM/GERAN, a base transceiver station may be at least partly controlled by a base station controller (BSC). In the case of multiple eNBs in the communication network, the eNBs may be connected to each other with an X2 interface as specified in the LTE. The eNB 100 may be further connected via an S1 interface to an evolved packet core (EPC) 110, more specifically to a mobility management entity (MME) and to a system architecture evolution gateway (SAE-GW).

The network may serve at least one terminal device 104, located within the cell 102. The terminal devices 104, 106 may communicate with each other via the base station 100. The terminal device 104,106 may be a terminal device of a cellular communication system, e.g. a computer (PC), a laptop, a palm computer, a mobile phone, a smart phone or any other user terminal (UT) or user equipment (UE) capable of communicating with the cellular communication network.

Typically the network uses licensed bands for communication. However, at times there exists a need to apply more resources. This may be accomplished by performing communications on unlicensed bands, such as LTE-Unlicensed (LTE-U), a.k.a. Licensed Assisted Access (LAA) for LTE. An example frequency band for such unlicensed LTE-operation may be the 5 GHz industrial, scientific and medical (ISM) band. Although the licensed band LTE may have better service quality than the unlicensed spectrum and the LTE-U does not remove the need to have more licensed band, the LTE-U may be advantageous to meet the user demands in some situations. One solution may also be WiFi offloading, but the LTE on unlicensed band can perform better than WiFi when the system becomes heavily loaded.

Before being permitted to transmit on a given unlicensed radio band, a terminal or an access point (such as an evolved node B (eNB) of the LTE-A) may, depending on the regulatory requirements, need to monitor the given radio frequency for a short period of time to ensure the spectrum is not already occupied by some other transmission. This requirement is referred to as List-before-talk (LBT)-procedure.

In an embodiment, the proposed approach is applicable to frame based equipment. Such frame based equipment are equipment where the transmit/receive structure is not directly demand-driven but has fixed timing. For the frame based equipment, the LBT operation may be defined as follows.

Before starting transmissions on an operating channel, the equipment (either eNB 100 in downlink or UE 104/106 in uplink) may be required to perform a List-before-talk (LBT) procedure, such as a Clear Channel Assessment (CCA) process. The equipment may observe the operating channel(s) for the duration of the CCA observation time. This may be at least 20 microseconds. The energy detection threshold for the CCA may be proportional to the maximum transmission power of the transmitter.

The operating channel is considered occupied if the energy level in the channel exceeds a pre-set energy detection threshold during the CCA duration. If the equipment finds the operating channel occupied, the equipment may not transmit on that channel during a next, predefined, fixed frame period. However, if the equipment finds the operating channel(s) to be clear, the equipment may transmit on the channel.

The total time during which the equipment may have transmissions on a given channel without re-evaluating the availability of that channel, is defined as a channel occupancy time. The channel occupancy time may be in the range 1 ms to 10 ms and the minimum idle period may be at least 5% of the channel occupancy time used by the equipment for the current fixed frame period. Depending on the regulatory requirements, channel occupancy times outside the given range (from 1 ms to 10 ms) may also be considered.

Although these rules may partly define some boundary conditions for the system operating on the respective spectrum, these regulations do not provide for a detailed solution on how to define and operate the system. For example, one problem related to the LBT in connection of LTE-U is how to support LBT on top of the current LTE radio frame structure such that commonality with current the LTE radio frame structure is maximized and system overhead due to the LBT is minimized. Furthermore, it may be important to support both uplink (UL) and downlink (DL) operations.

Therefore, there is proposed a channel reservation window arrangement which is suitable at least for downlink and uplink time division duplex (TDD) communication on the LTE-U band. The communication may take place between a network element (e.g. the eNB 100) and a terminal device (e.g. the UE 104). That is, the UE 104 may be capable of both transmitting and receiving on the unlicensed band. Due to the application of the LTE-U band, the proposed channel reservation window may support the LBT-procedure (such as the CCA). The proposed channel reservation window may comply with a maximum number of DL and UL resources that can be supported without violating the LBT requirements.

As shown in FIGS. 2 and 3, in order to define a channel reservation window (CRW) 300, the eNB 100 may, in step 200, set a length for the CRW 300 such that the CRW 300 comprises a plurality of subframes 302. Then the eNB 100 may in step 202 divide the CRW 300 at least into a DL part 304 and an UL part 306. FIG. 2 depicts a method which may be performed by a radio device, such as the eNB 100. The other accompanying Figures may provide further embodiments by describing the method of FIG. 2 in details.

The DL part 304 may comprise at least one or more DL subframes (marked with diagonal bricks). In some embodiment, the DL part 304 may further comprise a DL pilot time slot 310 (DwPTS, marked with dots). The length of DL part 304 may be defined by the number of DL subframes and by the configuration of the DwPTS 310 (e.g. the length of the DwPTS 310). The length of the DL part 304 may be predefined or configured via higher layers signaling. At maximum, the length of the DL part 304 equals to the CRW periodicity.

The UL part 304 may comprise at least one or more UL subframes (marked with vertical dashes), as shown e.g. in FIGS. 3A-3C. The length of UL part 306 may be defined by the number of UL subframes (and by the configuration of an uplink pilot time slot, UpPTS 314, if present). The length of the UL part 306 may be predefined or configured via higher layers signalling.

In some embodiments, the eNB 100 may further assign at least one subframe of the CRW 300 as a special subframe 308 comprising at least the DL pilot time slot 310 and a guard period 312 (white block), the guard period (GP) being for switching between the DL part 304 and the UL part 306. Thus, the GP 312 may compensate for the hardware delay of switching. Further, the GP 312 may be needed for switching from the DL to the UL. Further, the GP 312 may be used to compensate for the maximum propagation delay between the communication parties (e.g. the eNB 100 and the UE 104). Thus, the GP length may determine the maximum supportable cell size.

The DwPTS 310 may be used for DL transmission and may carry reference signals and control information as well as data, at the discretion of the scheduler. It may also carry a primary synchronization signal (PSS). The individual time durations in symbols (e.g. in orthogonal frequency division multiple access, OFDMA, symbols) of the special subframe parts are adjustable by network configuration, for example. There may be different predefined configurations for the special subframe 308. As such, a suitable TDD special subframe configuration may be selected or determined to define the lengths of DwPTS 310, GP 312 and UpPTS 314, if present.

There may be different configurations of the CRW 300. The number and format of the configurations may be predefined. The ratio between the DL subframes and the UL subframes may vary depending on the configuration. When the length of the CRW 300 is 5 ms (a non-limiting example length), different configurations of the CRW 300 may be 1 DL vs. 3 UL, 2 DL vs. 2 UL, 3 DL vs. 1 UL, and 4 DL vs. 0 UL. Each of these may comprise one special subframe 308 after the DL parts 304. It may be noted also that there may be configurations in which there are more than one DL parts in the CRW 300. These types of configurations including at least two DL parts may require an UL-DL transition within the CRW 300, which may be handled by the use of the guard period connected to the TA 318. In case there are more than one UL part, there may also be need for another special subframe preceding the second UL part. The selection of the configuration may depend on the current service requirements. However, for simplicity, let us consider a case with one DL part 304 and one UL part 306. Such configuration may provide most efficient resource usage.

In an embodiment, the length of the CRW 300 varies between 2 ms and 10 ms. If we denote the number of subframes 302 as N, then $N \in [2, 3, \ldots, 10]$. As known, ten consecutive subframes 302 form a radio frame of the LTE. Thus, using $N \in [2, 3, \ldots, 10]$ may be advantageous in order to provide backwards compatibility, for example. In an embodiment, the defined CRW 300 has a length of 5 ms or 10 ms. The TDD frame format has a periodicity of 5 ms, so the use of 5 ms or 10 ms may be beneficial and efficient. In the example Figures, the length is depicted to be 5 ms (corresponding to five subframes), for simplicity.

FIG. 3A further shows an uplink pilot time slot 314 (UpPTS, marked with right leaning diagonal dashes). The UpPTS 314 may be intended, e.g., for sounding reference signals (SRS) transmission from the UE 10. However, the use of the UpPTS 314 is not mandatory (i.e. the UpPTS 312 may or may not be used for UL transmission) and in some embodiments, the UpPTS 314 is omitted. If the UpPTS 314 is not used, there is more room for the GP 312 and for the DwPTS 310 in the special subframe 308. In case the UpPTS 314 does exist, the UpPTS 314 may be comprised in the UL part 306, as the Figures show.

A CRW 300 obtained in this manner is shown in FIG. 3. These Figures also depict the beginning of a next CRW 316 for clarity. The channel reservation window 300 may thus comprise the DL portion 304 including one or more DL subframes, followed by the special subframe 308, and UL portion 306 including one or more UL subframes. The number of DL subframes, special subframes and UL subframes, as well as the CRW 300 length may be predefined or configured via higher layers signalling, for example. The number of DL subframes, the length of the DwPTS 310, GP 312 and UpPTS 314 in the special subframe 308 and number of the UL subframes may together determine the periodicity of the defined CRW 300.

This type of time division duplex (TDD) CRW 300 may be shared in time domain between the UL and DL. In a half-duplex communication type, the transmissions in the TDD are not continuous because all UL transmission may be on hold while any DL resource is used and the other way around.

The operations related to DL portion/part 304 (i.e. eNB transmission) and the UL portion/part 306 (i.e. UE transmission) apply the CRW 300 with different timings, as shown in FIG. 3B, for example. Therefore, in step 204, the eNB 100 may determine a DL-UL timing offset 320 between the start of the DL part 304 and the start of the UL part 306. The DL-UL timing offset 320 is based at least partly on applied TA 318 between the eNB 100 and the UE 104. For simplicity, FIGS. 3B and 3C do not depict switching gap from the UL to DL. This timing difference between the DL and UL portions 304, 306 may define not only the timing difference but also the UL-DL split in subframes within the CRW 300. Thus, the timings and lengths of the DL part 304 and the UL part 306 are linked via the timing offset 320. For example, the timing of the first UL transmission may depend on the DL timing, the determined DL-UL timing offset 320, and the timing advance value 318. As another example, the timing of the last UL transmission subframe within CRW 300 may depend on the DL timing, the determined DL-UL timing offset 320, the timing advance value 318, and the length of CRW 300.

The timing offset 320 may further be determined on the basis of number subframes in the DL part 304 and on the basis of lengths of the DwPTS 310 and the GP 312. One further factor affecting the determination of the timing offset 320 is the knowledge of the scheduled UL grants. In an embodiment, if there are no UL transmission assigned for the time period of the UpPTS 314, then the timing offset 320 may be larger as the UE 104 does not transmit during the UpPTS 314. In case there is UL transmission during the UpPTS 314, the DL-UL timing offset 320 (TO) may be given as TO=(length of DL subframes)+(length of special subframe 308)−(length of TA 318)−(length of UpPTS 314).

In case the UpPTS 314 is not present, then TO=(length of DL subframes)+(length of special subframe 308)−(length of TA 318).

As the defined CRW 300 may be used on the LTE-U band, the CRW 300 may need to comprise time periods for both, a DL clear channel assessment-process (DL CCA) 322 performed by the eNB 100 before it is allowed to transmit, and an UL clear channel assessment-process (UL CCA) 324 performed by an UE 104 before it is allowed to transmit. Although CCA is used as an example, there may be other LBT solutions available which are equally applicable.

It is proposed that in step 206 the eNB 100 defines timings, within the CRW 300, for at least one of the DL CCA 322 and the UL CCA 324 at least partly on the basis of the DL-UL timing offset 320, as shown in FIGS. 3B and 3C, for example. The timing of the DL portion may define the eNB's DL CCA timing such that the DL CCA 322 is performed right before the DL portion 304. The timing of the UL portion 306 may define UE's UL CCA timing. UL timing is linked to the DL timing by means of the DL-UL timing offset 320 and the timing advance value 318. In a given CRW configuration/format, the larger the TA 318 applied, the smaller is the timing offset 320, and vice versa. During the CCA periods 322, 324 (UL and DL, respectively), the communication parties 100 and 104 may be configured to be silent (no transmission) on the LTE-U band. The required lengths of the CCA periods 322 and 324 may be preconfigured or dynamically given by the network.

Let us first take a closer look on the timing of the UL CCA 324. In an embodiment, the UL CCA process is performed before the end of the DL-UL timing offset 320 and at least during the guard period 312, as shown in FIG. 3C. In other words, UL CCA observation time 324 of a predefined or configured length is started during the GP 312 so that the UL CCA observation time 324 ends right at the end of the DL-UL timing offset. Alternatively, the UL CCA observation time 324 may start right after the UE 104 has received the end of DL transmission (i.e. after the DwPTS 310). In an embodiment, after the UL CCA 324 there may be only switch from the RX to TX (i.e. from DL to UL) before the UL transmission. The eNB 100 may be silent during the UL CCA process 324 (i.e. the eNB 100 may not transmit during that period) on the LTE-U band. Further, the eNB 100 may guarantee that during the UL CCA process 324, the other UEs (e.g. the UE 106) in the cell 102 is not allowed to transmit.

As said, in an embodiment, the special subframe 308 further comprises the UpPTS 314 after the guard period 312. In an embodiment, the UL CCA 324 may take place also during the UpPTS 314. In such case, the eNB 100 may restrain from scheduling UL transmissions at least for a part of the UpPTS 314 in order to enable the UL CCA process 324 to continue during the UpPTS 314. This is shown in FIG. 4C, where the eNB 100 has not scheduled any uplink transmissions (such as SRS and random access channel (RACH) preambles) for at least part of the UpPTS 314 and consequently, the UpPTS 314 is shown as a white block without transmissions. Now there is more time and flexibility to perform the UL CCA process 324. This embodiment may allow larger cell sizes, as the propagation delay may be large.

Thus, the UL CCA/LBT measurement opportunity 324 takes place during the special subframe. The UL CCA 324 may take place only during the GP 312, or the UL CCA 324 may take place during the time period defined by GP 312 and the UpPTS 314.

In an embodiment, the eNB 100 may indicate to the UE 104, e.g., via higher layer signalling according to which of the two above options the UE 104 shall perform CCA/LBT measurements 324, i.e., whether to limit the UL CCA process 324 to the guard period 312 or not. In yet one embodiment, the UL CCA 324 may take place only during the unscheduled UpPTS 314.

Let us then take a closer look on the DL CCA 322. In an embodiment, as shown in FIG. 3C, the DL CCA process 322 may be performed during the last subframe of the CRW 300 and the timing of the DL CCA process is defined by the length and timing of the CRW 300. In this way, the eNB 100 may perform the DL CCA 322 always before the next set of DL transmissions in the next CRW 316. This may be advantageous so that collisions may be avoided and to ensure that the regulations are met. During the DL CCA 322, the UE 104 is configured not to perform any UL transmissions.

In one embodiment for performing the DL CCA 322, shown in FIG. 4A, the eNB 100 may restrain from scheduling any UL transmissions for at least part of the last subframe of the CRW 300, as shown with reference numeral 400. This may mean that the UL data is received at the eNB 100 before the end of the current CRW 300. Therefore, there remains time period p for the eNB 100 to perform the DL CCA process 322 during the unoccupied part of the last subframe. In an embodiment, the eNB 100 may perform the CCA/LBT measurement 322 during the last single frequency-frequency division multiple access (SC-FDMA) symbol(s) of the last UL subframe of the channel reservation window 300 (i.e. the SC-FDMA symbol that might otherwise be configured for transmission of the SRS). In this case, the last SC-FDMA symbol(s) of the last subframe may be unscheduled and reserved only for the sake of providing the CCA/LBT opportunity 322 for the eNB 100. Here a TA 318A of "normal" length may be used, i.e. the determined TA 318A may be based on the propagation delay between the eNB 100 and the UE 104 (and 106)

In another embodiment, the eNB 100 may first determine the time advance value (TA 318) for the UE 104 (or whichever UE is the communication party). However, the eNB 100 may then increase the TA 318 such that a time period 402 for the DL CCA process 322 is generated after the UL data has been received and before a next CRW 316 begins, as shown in FIG. 4B. The increased TA is shown with reference numeral 318B and the diagonal dotted lines depict that the adjusted TA 318B is longer than the propagation delay would require. As a consequence, the eNB 100 may indicate the over dimensioned TA 318B to the UE 104 and perform the DL CCA process 322 after the UL data has been received during the last subframe of the CRW 300. This embodiment may be advantageous as there may be time for the eNB 100 to perform the LBT measurement 322 without a need for simultaneous UL reception even if the last UL subframe of the CRW 300 is fully occupied, as shown with reference numeral 404 in FIG. 4B. In other words, there may be no need for shortening the last UL subframe (as is done in the embodiment of FIG. 4A).

In one embodiment, the TA increment may be predefined (e.g. by network specification) for any LTE-U UL transmission. Then, the eNB 100 may not perform the TA adjustment, but the UE may, before transmission, perform the TA adjustment itself. This may save resources from the eNB 100.

In an embodiment, the eNB 100 may dimension the special subframe 308 of the CRW 300 to ensure that sufficient room for the DL CCA 322 and for the UL CCA 324 (two idle periods), as well as for the TX/RX switches (i.e. from CCA observation to transmission). The UL CCA 324 is done during the special subframe, but the correct dimensioning of the special subframe 308 (e.g. via the determination of the TA 318) may also ensure sufficient room for the DL CCA 322 at the end of the CRW 300, as explained and shown in Figures.

In an embodiment, the eNB 100 may dimension the special subframe by determining the timing advance 318 and the guard period 312 such that the UE 104 has time to perform the UL CCA 324 before the start of the uplink part 306 and the eNB 100 has time to perform the DL CCA 322 before the start of the 304 of the next CRW 316A. The eNB 100 may further, in an embodiment, indicate the determined TA 318 to the UE 104.

In an embodiment, the eNB 100 may indicate at least part of the configuration of the CRE 300 to the UE 104. In an embodiment, the indicated part of the configuration may comprise e.g. information of the DL part 304 and/or information of the UL part 306, such as the number subframes of the corresponding part 304,306 and/or timing of the corresponding part 304, 306. The indicated part may also comprise length and/or timing information of at least one of the following: TA 318, guard period 312, DwPTS 310, UpPTS 314, DL-UL timing offset 320.

In an embodiment, as shown in FIG. 5, there may be different configurations of the CRW, each configuration setting the division between the DL part 304 and the UL part 306. The eNB 100 may dynamically change (override) the current configuration of the CRW 300, e.g. via physical layer signalling. Such reconfiguration possibility may be called as flexible UL-DL operation. FIG. 5 shows three different configurations, 300A (2 DL-2 UL), 300B (4 DL-0 UL), and 300C (1 DL-3 UL). Figure also shows, with reference numerals 600A and 600B, the dynamic overrides of the current configuration. Each override may have pre-set validity duration, after which the previous configuration is taken into use. Each override may last for a single CRW duration, for example. This may save signalling resources. In another embodiment, the validity duration is signalled along with each override. In yet one embodiment, each override will be valid until otherwise indicated.

Each configuration has a special subframe 308 following the DL subframes. For simplicity, it is assumed that the special subframes 308 do not comprise the UpPTS 314, only the DwPTS 310A-310C and the GP 312A-312C. Also, for simplicity, it is assumed that the length of the CRW 300A-300C is five ms (comprising five subframes).

FIG. 5 also shows the use of the different CRWs 300A-300C from the point of view of the eNB 100 (DL view) and the UE 104 (UL view). First the eNB 100 starts the DL transmission during two DL subframes and the DwPTS 310A. Then the eNB 100 enters the guard period 312A and changes to RX mode. Once the UE 104 has received the DL data, the UE 104 starts the UL CCA 324A during the GP 312A. If CCA/LBT measurement 324A indicates that the channel is free and the UE 104 has received an UL grant addressing one or more UL subframes in the CRW 300A, the UE 104 shall transmit physical uplink shared channel (PUSCH) according to the UL grant(s). Before transmission, the UE 104 also makes the switch from Rx to TX.

However, if the channel is sensed not free according to CCA/LBT 324A, the UE 104 may omit the PUSCH transmission. As will be discussed later, the control signalling on the physical uplink control channel (PUCCH) may still be transmitted via a primary cell (PCell). For example, PUCCH related to LTE-U carrier of the secondary cell (SCell) may be conveyed via the PCell, according to the LTE carrier aggregation principles of having PUCCH on PCell only.

The last UL subframe may be scheduled to be partly unoccupied so that the eNB 100 may perform the DL CCA 322A before the start of the next CRW 300B. If the DL CCA/LBT measurement 322A gives a positive result (i.e. the unlicensed channel is free), the eNB 100 may transmit DL signals in all DL subframes of the CRW 300B (starting from the first DL subframe, and based on the instantaneous DL traffic needs). In case, the CCA 322A indicates not free channel, the eNB 100 may not transmit any data during the CRW 300B. However, short control signalling, such as DRS/SCS (Discovery Reference Signals/Short Control Signals), may in an embodiment be transmitted.

Here the second CRW configuration 300B includes only DL subframes (referred to as a DL-only CRW). Therefore, as shown, the UE 104 may advantageously not perform the UL CCA 324B during the GP 312B because the UE 104 does not have any transmission slots. However, the eNB 100 may need to perform, at the end of the CRW 300B, first a switch from Tx to Rx, then the DL CCA 322B, and finally (if DL CCA 322B indicates a free channel), a switch from Rx to Tx. Then, in the CRW 300C, the eNB 100 transmits first one DL subframe and the DwPTS 312C after which it changes from the Tx to Rx during the GP 312C.

The eNB 100 may schedule the UL subframes consecutively, starting from the first UL subframe of the CRW 300C and may include all the available following consecutive UL subframes (so that the UE 104 does not need to do any UL CCA in between UL subframes). The eNB 100 may have transmitted the necessary UL scheduling grants before it performs the DL CCA 322B measurement. The scheduling (e.g. LTE-U TDD Carrier self-scheduling or cross-carrier scheduling) may take place via the LTE PCell, for example. The UE 100, now having UL grants and UL subframes scheduled, performs the UL CCA 324C (and switches from Rx to Tx) during the GP 312C and starts transmitting the UL subframes. In this manner the communication may take place between the eNB 100 and the UE 104 by utilizing the CRWs 300A-300C.

In an embodiment, there is a pre-set default channel reservation window configuration. In an embodiment, a TDD UL-DL configuration #0 is applied for defining the subframe types of the CRW 300. In the TDD UL-DL configuration #0, the subframes of one radio frame are D, S, U, U, U, D, S, U, U, and U, wherein D stands for downlink, U for uplink, and S for special subframe. Such TDD UL-DL configuration #0 may thus comprise two CRWs, each defined by a configuration D, S, U, U, U. In an embodiment, this TDD UL-DL configuration #0 may be taken as the default configuration of the CRW 300. However, instead of the TDD UL-DL configuration #0, any TDD configuration may be used as the basis for the LTE-U TDD operation to derive the default CRW configuration.

In an embodiment, a configuration of the CRW 300 comprises at least one static subframe reserved for DL use only, and at least one dynamic subframe reserved for dynamic allocation between UL and DL use. For example in the FIG. 5, the static (DL-only subframes) may be subframes #0, #5, and #10. As the special subframe may follow the DL part 306, also the subframes #1, #6, and #11 may be seen as static subframes not available for dynamic UL usage. However, the rest of the subframes, i.e. subframes #2-#4, #7-#9, and #12-#14, may be dynamic subframes and may thus be used either for UL or for DL.

In an embodiment, the number of dynamic subframes reserved for dynamic allocation between uplink and downlink use depends at least partially on the timing offset 320. In an embodiment, relationship may be defined in the following way: N2=floor (N−TO−Y), wherein the floor operation maps a real number to the largest previous integer, N denotes the length of the CRW 300 in subframes, N2 is the number of dynamic subframes, TO is the length of the DL-UL timing offset 320 in ms, and Y denotes a real number represents the guard period 312 (may also be zero).

In an embodiment, the eNB 100 may dynamically override the current configuration of the CRW 300 with a new configuration in which at least one dynamic subframe of the previous configuration is reassigned from the UL part to the DL part or from the DL part to the UL part. Such option of dynamically changing the purpose of at least one subframe may be called as the flexible UL-DL operation. The override may take place e.g. via higher layer signalling or physical layer signalling such as downlink control information (DCI).

For example, in FIG. 5, the default TDD UL-DL configuration #0 is used for the CRW 300C, but the first two CRWs 300A, 300B may have been dynamically reconfigured. This reconfiguration may mean for CRW 300A that the dynamic (a.k.a. flexible) subframe #2 has not been used as UL subframe but as a special subframe. For the CRW 300B, the temporal dynamic overdrive may have caused the flexible subframes #7 and #8 to serve as DL subframes and the flexible subframe #9 to serve as a special subframe. In an embodiment only two configurations are selectable in dynamic manner, configuration A having a predetermined UL-DL split and configuration B having only DL subframes. This embodiment may keep the CCA timing for both UE and eNB fixed and predefined.

In an embodiment, the eNB 100 may transmit DL discovery signals in the at least one static (DL) subframe. In an embodiment, the eNB 100 may transmit non-UE specific reference signals (such as synchronization signals (PSS/SSS), cell-specific reference signals (CRS) and/or channel state information reference signals (CSI-RS) in the static (DL) subframe(s).

In one embodiment, the CRW 300 (consisting of DL, S and UL subframes) may be temporarily reconfigured to comprise only DL subframes (i.e. reconfigured to a DL-only CRW having only DL subframes followed by the S subframe), as implied by the CRW 300B. The DL-only CRW configuration may be realized, for example, so that physical layer signaling (such as downlink control information, DCI) temporarily overrides the predefined CRW 300.

In one embodiment related to the flexible UL-DL operation, the special subframe 308 in the CRW is dimensioned such that there is sufficient room for two CCA processes 322 and 324, as well as TX/RX switching. It may be up-to the eNB 100 and/or specification to ensure that sufficient switching time is available for the UE 104 to make Tx/Rx switching and for the CCAs 322, 324. However, in the DL-only CRW 300B, the special subframe 308 may be dimensioned such that there is sufficient room for a single idle period (time for DL CCA process 322 at the end of the CRW 300B), as well as for the Tx/Rx and Rx/Tx switches. This embodiment may leave more room for the DwPTS 310B. Regarding the dimensioning of the last subframe of the DL-only CRW, the reader is referred to patent application number XXXX, the content of which is incorporated by reference.

FIG. 6 shows an example of a scenario in which the UE 104 detects that there are no UL grants assigned or that there are no UL subframes in the defined CRW 300. For example, the DL-only CRW 300B is shown in FIG. 6. In such case, the UE 104 may decide in step 600 not to perform the UL CCA process 324 because there are no UL grants assigned to the UE 104 or because the CRW is reconfigured not to comprise any UL subframes (i.e. not to comprise the UL part 306, but only the DL part 304 and the special subframe 308). Therefore, the UE 104 may restrain from performing the UL CCA-process when there are no UL grants assigned or when there are no UL subframes in the current CRW. This may be advantageous so that the UE 104 does not use any resources for a task that is not needed and that provides no benefit. However, the predefined timing for the coming UL CCA processes can be maintained.

In an embodiment, as shown in FIG. 7A, three CRWs are applied on top of a radio frame 700, 702 applying the TDD UL-DL configuration #0. As shown in the Figure, the CRWs do not need to be aligned with the radio frames 700, 702. The start of a given CRW may be later than the start of the radio frame 700, for example by 4 subframes as is illustrated in the exemplary FIG. 7A.

In an embodiment, as shown in FIG. 7B, the start of the CRW 300 may be time positioned with respect to a predetermined reference 710. For example, the time positioning may define that the transmission on the CRW 300 starts at the same time as a transmission of the reference 710. In another embodiment, shown in FIG. 7C, there may be a reference offset parameter 712, which may define the start of the CRW 300 with respect to the reference 710.

In an embodiment, the reference 710 comprises a transmission of one of the following: a primary synchronization signal (PSS), a secondary synchronization signal (SSS). Use of PSS/SSS, may be advantageous also from the point of view that typically other reference signals are more spread over the radio frame duration. It may be noted also that the PSS/SSS may be used to determine radio frame timing also in the normal LTE. The reference 710 may be the transmission of the PSS/SSS on a predetermined radio frame, such as radio frame #0.

In an embodiment, the reference 710 is given in an accuracy of a subframe. Therefore, in case the reference 710 comprises the transmission of the PSS, then the reference 710 to which the CRW 300 is time aligned or in time offset, denotes the subframe used for transmitting the PSS.

In an embodiment, the eNB 100 participates in carrier aggregation (CA) and the defined CRW 300 is applied for transmissions on a secondary cell (SCell). Further, in an embodiment, the reference 712 comprises a radio frame transmitted on a primary component carrier (PCell). Thus, there may be a fixed timing relationship between the PCell and the LTE-U operation utilizing the CRW 300 on the SCell. For example, the beginning of a radio frame transmitted on a primary component carrier (PCC) of the PCell and the beginning of a radio frame transmitted according to the channel reservation window 300 on a secondary component carrier (SCC) of the SCell may be time aligned.

In an embodiment, radio frame and the CRW may have different lengths. In such case, the timing relationship between the radio frame and CRW may depend on the radio frame or the subframe number. The radio frame may be used to determine e.g. time positions of certain signals on SCell, such as the PSS/SSS, while the CRW 300 may be used to meet the regulatory requirements on the fixed frame period. In another embodiment, the radio frames on SCell 802 and PCell 800 may be time aligned. This may provide ease of specification, configuration and implementation.

In an embodiment, the subframes of the radio frame transmitted on the PCC and the subframes of the radio frame transmitted on the SCC according to the CRW 300 are time aligned. Time aligning the subframes may provide efficiency. In another embodiment, there is a full time alignment between the PCell and LTE-U operation. This may mean that the symbols are fully time aligned as well.

In an embodiment, the applied reference offset 712 in one cell (e.g. the cell 102) is different than a corresponding reference offset applied in a neighboring cell. Having configurable reference offset may be used to ensure that the CCAs are not time aligned in neighboring non-coordinated LTE-U cells. This may be useful for the LTE-U coexistence with multiple LTE-U deployments by different operators, all served by PCells that are time-synchronized (e.g. time division duplex (TDD)-cells where different operators are synchronized).

In one embodiment, the eNB 100 may apply, during the transmission on the PCC of the PCell, an integral number of CRWs on the SCell, each CRW having the same length. That is, the usage of the LTE-U CRW formats may be static or semi-static. The eNB 100 may configure the LTE-U channel reservation window format usage and timing with respect to the PCell via higher layer signaling. In an embodiment, the usage of the channel reservation window format usage and timing is pre-coded to the eNB 100.

In another embodiment, a varying LTE-U channel reservation window format from channel reservation window to channel reservation window may be applied. That is, each cell/eNB may select one of the available LTE-U channel reservation window formats/configurations at a time. In this embodiment, the eNB 100 may define a plurality channel reservation windows with different lengths. It may be noted, that in an embodiment, the available LTE-U channel reservation window formats may be tabulated in the specification and pre-coded to the eNB 100. Moreover, in an embodiment, the set of LTE-U channel reservation window formats may be configured to the UEs 104, 106 (e.g. via higher layers).

The eNB 100 (or e.g. a user equipment) may, after detecting that the channel is free for transmission (e.g. after the CCA energy detection), select one of the plurality of channel reservation windows configurations for data transmission to a target device (such as to a user terminal or to a eNB, for example). The eNB 100 may then indicate the selected channel reservation window 300 to a target user terminal (e.g. the UE 104). For example, the eNB 100 may include the LTE-U channel reservation window format indicator in layer 1 (L1) signaling. As one non-limiting option, the indication may be made by including 1-4 bits in a scheduling assignment on the Physical Downlink Control Channel (PDCCH) or on the enhanced PDCCH. The eNB 100 may then perform the data transmission in the selected channel reservation window 300 to the user terminal 104.

In an embodiment, the applied channel reservation window format, varying from channel reservation window to channel reservation window, may be determined according to a pseudo-random pattern determined at least partially based on SCell physical cell identity. An outcome of a pseudo-random number generator depending for example on a channel reservation window number or on a subframe number and initialized at least partially with SCell physical cell identity may be used to determine the applied channel reservation window format. This embodiment may support fair LBT-procedure and access to the radio channel between neighboring cells.

As indicated above and shown in FIG. 8, the eNB 100 may participate in the CA and the defined CRW 300 is applied for transmissions on the SCell 802. In an embodiment, the LTE-U may be developed so that it relies on the licensed band LTE operations. For example, in the CA, the PCell 800 may operate on the licensed band, whereas the unlicensed band may provide resources for the SCell 802 utilizing the defined CRW 300.

In an example, transmissions on SCell 802 comprise only downlink transmissions while PCell 800 is at least partly used for necessary uplink transmissions. Such SCell 802 may be termed as supplementary downlink cell (SDL). In an embodiment, the channel reservation window 300 is applicable to the SDL operation. In an embodiment, the PCell is served by another base station than the eNB 100 providing the SCell and the SCC. In yet one embodiment, the channel reservation window 300 is applicable to the supplementary uplink (SUL) operation.

In an embodiment, the data transmission in the UL or in the DL is performed on the SCell 802 and at least one of acknowledgement feedback for the data transmission and scheduling grants are obtained on the PCell 800. Thus, the channel reservation window 300 is used for the transmissions on the SDL/SUL, while the feedback signaling and/or control information is received on the PCell which may operate on a licensed band and thus may not need to use the LBT/CCA process. Certain part of the control information can be conveyed also via the SCell 802.

In one embodiment, the eNB 100 may exchange channel reservation window usage information with at least one neighboring network node, such as with neighboring eNBs. This embodiment may support coordination of the LTB channel reservation window format usage among neighboring cells. This may enable different interference coordination schemes for the CCA. As one option, this may ensure that neighboring eNBs do not use the same timing for the CCA processes 322, 324. The coordination may be made via the X2 signaling, for example. The information elements coordinated to the neighboring cells may include, e.g., the usage of LTE-U channel reservation window formats and the timing of the LTE-U operation.

Although the description has been written so that the base station 100 performs the method of FIG. 2, the method may be performed by any radio device performing radio communication according to the CCA requirements, such as a user equipment.

As OFDMA symbols are used in the description as an example, it may be noted that a block-processing based approach is valid. This may mean that the proposed embodiments are equally valid for any waveform based on block-processing, including e.g. the Discrete Fourier Transform Spread OFD-MA (DFT-S-OFDMA).

From the point of view of the UE 104, the UE 104 may in step 900 of FIG. 9 receive an indication of the defined CRW 300. The DL transmission may be transmitted on the physical downlink shared channel (PDSCH). The end of DL assignment may coincide with the end of the DL data transmission. The DL data transmission may also experience propagation delay, which may be handled by proper configuration of the GP part 312 of the CRW 300. The UE 104 may know from the applied frame structure when it has UL grants assigned. Then the Ue 104 may know that the UE 104 needs to make the UL CCA process 324 before the UL transmissions. Thus, the UE 104 may, after receiving the end of the DL data transmission, i.e. after receiving the DwPTS 310, perform, in step 902, the UL CCA process 324 before the start of the uplink part 306. the configuration of the TA 318 and the GP 312 (i.e. the configuration of the DL-UL timing offset) by the eNB 100 may ensure that the UE 104 has enough time to do the UL CCA 324 (and also that the eNB 100 has enough time to do its DL CCA process, as explained above). In case, there are no uplink grants assigned or the CRW 300 is redefined not to comprise any uplink subframes (i.e. no UL part 306), the UE 104 may restrain from performing the UL CCA process 324.

In an embodiment, the proposed solution may have maximum commonality with the current LTE frame structures. This may be enable back-ward compatibility and straight-forward implementation. In an embodiment, overhead due to the CCA may be minimized.

In an embodiment, the proposed channel reservation window 300 facilitates good interworking with the PCeII in case of using the LBT (and, thus, the generated channel reservation window 300) on the SCeII. In an embodiment, the proposed channel reservation windows provide flexibility to match requirements in different bands and/or regions, while at the same time providing maximization of the LTE-U channel utilization and respecting regulatory requirements. As one more possible advantage, the flexible TDD operation on the LTE-U carrier may be obtained. The proposed CRW may be made compatible with discovery signal transmission.

In the following, an example of an apparatus suitable for carrying out embodiments described above in relation to FIGS. 2 to 9 is presented. An embodiment, as shown in FIG. 10A, provides an apparatus 1000 comprising a control circuitry (CTRL) 1002, such as at least one processor, and at least one memory 1004 including a computer program code (PROG), wherein the at least one memory and the computer program code (PROG), are configured, with the at least one processor, to cause the apparatus to carry out any one of the above-described processes. The memory 1004 may be implemented using any suitable data storage technology, such as semiconductor based memory devices, flash memory, magnetic memory devices and systems, optical memory devices and systems, fixed memory and removable memory.

In an embodiment, the apparatus 1000 may be or be comprised in a base station, a base transceiver station, a Node B, a radio network controller, an evolved Node B, a node, a host, or a server, for example). In an embodiment, the apparatus 1000 is or is comprised in the eNB 100. In yet one embodiment, the apparatus 1000 may be or comprise a module (to be attached to the base station or to a relevant unit) providing connectivity, such as a plug-in unit, an USB stick, an USB dongle, a card or any other kind of unit. The unit may be installed either inside the base station or attached to the base station with a connector or even wirelessly.

The apparatus may further comprise communication interface (TRX) 1006 comprising hardware and/or software for realizing communication connectivity according to one or more communication protocols. The TRX may provide the apparatus with communication capabilities to access the radio access network, for example.

The apparatus may also comprise a user interface 1008 comprising, for example, at least one keypad, a microphone, a touch display, a display, a speaker, etc. The user interface may be used to control the apparatus by the user.

The control circuitry 1002 may comprise a CRW generation circuitry 1010 for defining the CRW, according to any of the embodiments. A LBT control circuitry 1012 may be for executing the CCA process. A CA control circuitry 1014 may be for performing operations related to carrier aggregation, according to any of the embodiments.

In an embodiment, as shown in FIG. 10B, at least some of the functionalities of the apparatus 1000 may be shared between two physically separate devices, forming one operational entity. Therefore, the apparatus 1000 may be seen to depict the operational entity comprising one or more physically separate devices for executing at least some of the described processes. Thus, the apparatus 1000 of FIG. 10B, utilizing such shared architecture, may comprise a remote control unit (RCU) 1052, such as a host computer or a server computer, operatively coupled (e.g. via a wireless or wired network) to a remote radio head (RRH) 1054 located in the base station. In an embodiment, at least some of the described processes may be performed by the RCU 1052. In an embodiment, the execution of at least some of the described processes may be shared among the RRH 1054 and the RCU 1052.

In an embodiment, the RCU 1052 may generate a virtual network through which the RCU 1052 communicates with the RRH 1054. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system. Virtual networking may also be used for testing the terminal device.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software (computer program codes or portions thereof), and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 2 to 9 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 2 to 9 may be carried out by executing at least one portion of a computer program comprising corresponding instructions. For example, the method of FIG. 2 may represent one or more steps carried out by executing at least one portion of the computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:
1. A method, comprising:
   setting, by a radio device, a length for a channel reservation window such that the channel reservation window comprises a plurality of subframes;
   dividing the channel reservation window at least into a downlink part and an uplink part, wherein the downlink part comprises at least one or more subframes of the plurality of subframes and the uplink part comprises at least one or more other subframes of the plurality of subframes;

determining a timing offset between a start of the downlink part and a start of the uplink part, wherein the timing offset is based at least partly on applied timing advance;

defining timings, within the channel reservation window, for at least one of a downlink clear channel assessment process and an uplink clear channel assessment process at least in part on the basis of the timing offset such that the downlink clear channel assessment process is carried out within the channel reservation window right before the downlink part and the uplink clear channel assessment process is carried out within the channel reservation window before an end of the timing offset, wherein an uplink clear channel assessment observation time starts during a guard period and ends at end of the timing offset or starts at end of the downlink part; and indicating the defined timings to a terminal device.

2. The method of claim 1, further comprising:
assigning at least one subframe of the plurality of subframes as a special subframe comprising at least the guard period for switching between the downlink part and the uplink part.

3. The method of claim 1, further comprising:
assigning at least one subframe of the plurality of subframes as a special subframe comprising at least the guard period for switching between the downlink part and the uplink part;
determining the timing advance and the guard period such that:
a terminal device has time to perform the uplink clear channel assessment process before the start of the uplink part, and
the radio device has time to perform the downlink clear channel assessment process before the start of the downlink part of the next channel reservation window; and
indicating at least the determined timing advance to the terminal device.

4. The method of claim 1, wherein the downlink clear channel assessment process is performed during a last subframe of the channel reservation window and the timing of the downlink clear channel assessment process is defined by the timing of the channel reservation window.

5. The method of claim 1, further comprising:
restraining from scheduling any uplink transmissions for at least part of a last subframe of the channel reservation window; and
performing the downlink clear channel assessment process during an unscheduled part of the last subframe.

6. The method of claim 1, further comprising:
determining a time advance value for a terminal device;
increasing the time advance value such that a time period for the downlink clear channel assessment process is generated after uplink data has been received and before a next channel reservation window begins;
indicating an adjusted time advance value to the terminal device; and
performing the downlink clear channel assessment process before the next channel reservation window.

7. A method, comprising:
receiving, by a terminal device, an indication of a channel reservation window for use in communication, wherein the channel reservation window comprises a downlink part and an uplink part, the downlink part comprising at least one or more subframes and the uplink part comprising at least one or more other subframes, wherein timing of the uplink part is linked to timing of the downlink part by means of a downlink-uplink timing offset, and wherein the timing offset is based at least partly on applied timing advance; and
performing an uplink clear channel assessment process within the channel reservation window before an end of the timing offset, wherein an uplink clear channel assessment observation time starts during a guard period and ends at the end of the timing offset or starts by an end of the downlink part.

8. The method of claim 7, further comprising:
restraining from performing the uplink clear channel assessment process when there are no uplink grants assigned or when the channel reservation window is redefined not to comprise any uplink part.

9. The method of claim 7, further comprising:
applying a predefined timing advance increment specific for uplink transmissions on an unlicensed band; and
taking the timing advance increment into account when performing the uplink clear channel assessment process.

10. An apparatus, comprising:
at least one processor and at least one memory including a computer program code, wherein the at least one memory and the computer program code are configured, with the at least one processor, to cause a radio device to:
set a length for a channel reservation window such that the channel reservation window comprises a plurality of subframes;
divide the channel reservation window at least into a downlink part and an uplink part, wherein the downlink part comprises at least one or more subframes of the plurality of subframes and the uplink part comprises at least one or more other subframes of the plurality of subframes;
determine a timing offset between a start of the downlink part and a start of the uplink part, wherein the timing offset is based at least partly on applied timing advance;
define timings, within the channel reservation window, for at least one of a downlink clear channel assessment process and an uplink clear channel assessment process at least partly on the basis of the timing offset such that the downlink clear channel assessment process is carried out within the channel reservation window right before the downlink part and the uplink clear channel assessment process is carried out within the channel reservation window before an end of the timing offset, wherein an uplink clear channel assessment observation time starts during a guard period and ends at end of the timing offset or starts at end of the downlink part; and
indicate the defined timings to a terminal device.

11. The apparatus of claim 10, wherein the at least one memory and the computer program code are configured, with the at least one processor, to cause the radio device to:
assign at least one subframe of the plurality of subframes as a special subframe comprising at least the guard period for switching between the downlink part and the uplink part.

12. The apparatus of claim 10, wherein the at least one memory and the computer program code are configured, with the at least one processor, to cause the radio device to:

assign at least one subframe of the plurality of subframes as a special subframe comprising at least the guard period for switching between the downlink part and the uplink part;

determine the timing advance and the guard period such that:
- a terminal device has time to perform the uplink clear channel assessment process before the start of the uplink part, and
- the radio device has time to perform the downlink clear channel assessment process before the start of the downlink part of the next channel reservation window; and indicate at least the determined timing advance to the terminal device.

13. The apparatus of claim 10, wherein the downlink clear channel assessment process is performed during a last subframe of the channel reservation window and the timing of the downlink clear channel assessment process is defined by the timing of the channel reservation window.

14. The apparatus of claim 10, wherein the at least one memory and the computer program code are configured, with the at least one processor, to cause the radio device to:
- refrain from scheduling any uplink transmissions for at least part of a last subframe of the channel reservation window; and
- perform the downlink clear channel assessment process during an unscheduled part of the last subframe.

15. The apparatus of claim 10, wherein the at least one memory and the computer program code are configured, with the at least one processor, to cause the radio device to:
- determine a time advance value for a given terminal device;
- increase the time advance value such that a time period for the downlink clear channel assessment process is generated after uplink data has been received and before a next channel reservation window begins;
- indicate an increased time advance value to the terminal device; and
- perform the downlink clear channel assessment process before the next channel reservation window.

16. An apparatus, comprising:
at least one processor and at least one memory including a computer program code, wherein the at least one memory and the computer program code are configured, with the at least one processor, to cause a terminal device to:
- receive an indication of a channel reservation window for use in communication, wherein the channel reservation window comprises a downlink part and an uplink part, the downlink part comprising at least one or more subframes and the uplink part comprising at least one or more other subframes, wherein timing of the uplink part is linked to timing of the downlink part by means of a downlink-uplink timing offset, and wherein the timing offset is based at least partly on applied timing advance; and
- perform an uplink clear channel assessment process within the channel reservation window before an end of the timing offset, wherein an uplink clear channel assessment observation time starts during a guard period and ends at the end of the timing offset or starts by an end of the downlink part.

17. The apparatus of claim 16, wherein the at least one memory and the computer program code are configured, with the at least one processor, to cause the terminal device to:
refrain from performing the uplink clear channel assessment process when there are no uplink grants assigned or when the channel reservation window is redefined not to comprise any uplink part.

18. The apparatus of claim 16, wherein the at least one memory and the computer program code are configured, with the at least one processor, to cause the terminal device to:
- apply a predefined timing advance increment specific for uplink transmissions on an unlicensed band; and
- take the timing advance increment into account when performing the uplink clear channel assessment process.

* * * * *